(12) United States Patent
Ding et al.

(10) Patent No.: US 10,922,519 B2
(45) Date of Patent: Feb. 16, 2021

(54) TEXTURE DETECTION DEVICE AND METHOD OF DETECTING A TEXTURE USING THE SAME

(71) Applicant: BOE TECHNOLOGY GROUP CO., LTD., Beijing (CN)

(72) Inventors: Xiaoliang Ding, Beijing (CN); Haisheng Wang, Beijing (CN); Chun Wei Wu, Beijing (CN); Yingming Liu, Beijing (CN); Rui Xu, Beijing (CN); Wei Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 83 days.

(21) Appl. No.: 16/320,348

(22) PCT Filed: Jan. 30, 2018

(86) PCT No.: PCT/CN2018/074557
§ 371 (c)(1),
(2) Date: Jan. 24, 2019

(87) PCT Pub. No.: WO2018/218980
PCT Pub. Date: Dec. 6, 2018

(65) Prior Publication Data
US 2019/0272408 A1    Sep. 5, 2019

(30) Foreign Application Priority Data
Jun. 2, 2017   (CN) .......................... 2017 1 0409886

(51) Int. Cl.
*G06K 9/00*      (2006.01)
(52) U.S. Cl.
CPC ......... *G06K 9/0004* (2013.01); *G06K 9/0008* (2013.01); *G06K 2009/0006* (2013.01)

(58) Field of Classification Search
CPC ........ B60R 21/0153; B60R 2022/4825; B60R 22/20; B60R 2001/1253; B60R 21/013;
(Continued)

(56) References Cited

U.S. PATENT DOCUMENTS 6,072,899 A * 6/2000 Irie .................... G01B 11/24
348/125
10,271,037 B2 * 4/2019 Oh .................. H01L 27/14634
(Continued)

FOREIGN PATENT DOCUMENTS

CN           104751155 A        7/2015
CN           105844212 A        8/2016
(Continued)

OTHER PUBLICATIONS

International Search Report and Written Opinion issued in International Patent Application No. PCT/CN2018/074557, dated May 2, 2018; with English translation.
(Continued)

*Primary Examiner* — Alex Kok S Liew
(74) *Attorney, Agent, or Firm* — McDermott Will & Emery LLP

(57) ABSTRACT

A method of detecting a texture includes: in each of a plurality of time periods included in a texture detection phase, forming a light-shielding region in a light transmitting hole forming layer, wherein the light-shielding region only includes a part of a plurality of light transmitting holes, and imaging regions of a texture to be detected on a photosensitive sensing layer through the light transmitting hole forming layer do not overlap; in different time periods of the plurality of time periods, positions of parts of the plurality of light transmitting holes included in the light-shielding regions are different; and splicing images of the
(Continued)

texture to be detected formed on the photosensitive sensing layer in the plurality of time periods together.

13 Claims, 12 Drawing Sheets

(58) Field of Classification Search
CPC .......... B60R 25/252; B60N 2002/0272; G01S 13/04; G01S 17/89; G01S 5/163; G01S 1/02; G02B 27/30; G02B 27/58; G02B 5/201; G02B 5/208; G02B 6/005; G02B 27/1013; G02B 27/102; G02B 27/126; G02B 27/32; G06K 9/0004; G06K 9/00; G01B 11/24; G06T 2207/10028; G06T 2207/10064; G06T 2207/30141; G06T 2207/30148; G06T 7/0008; G06T 7/001; G03B 19/04; G03B 7/16; G03B 15/05; G03B 15/08; G03B 15/16; G03B 17/02; G03B 17/04; G03B 17/44; G03B 17/48; G03B 19/00; G03B 19/023; G03B 21/10; G03B 2215/0503; G03B 2215/0514; G03B 33/00; G03B 35/00; G03B 7/08; G03B 7/091; G03B 7/09979; G03B 9/08; A61B 3/14; G01J 5/06; G01J 5/061; G01J 5/08; G01J 5/0831; G01J 5/084; G01J 5/0865; H04N 5/238; H04N 5/33; H04N 5/2257; G02F 1/133308; G02F 2001/133314; G02F 2001/133388; G02F 2001/133317; G02F 1/13318; G02F 2001/133331; G02F 2201/56; G02F 1/133512; G02F 1/133528; G02F 1/1339; G02F 2001/13312; H04M 1/0264; H04M 1/0266; H04M 2250/12; H01L 51/524; H01L 5/2257
USPC ......... 250/225, 208, 338; 382/125, 141, 149
See application file for complete search history.

(56) References Cited

U.S. PATENT DOCUMENTS

| | | | | |
|---|---|---|---|---|
| 2003/0190772 | A1* | 10/2003 | Toyota | H01J 9/025 438/200 |
| 2005/0196530 | A1* | 9/2005 | Caspar | B41M 5/38207 427/164 |
| 2006/0202104 | A1 | 9/2006 | Gurevich et al. | |
| 2006/0273284 | A1* | 12/2006 | Hirose | G02F 1/134309 252/299.61 |
| 2009/0157225 | A1* | 6/2009 | Jung | G01B 11/24 700/250 |
| 2010/0282945 | A1* | 11/2010 | Yokogawa | H01L 27/14625 250/208.1 |
| 2011/0255303 | A1* | 10/2011 | Nichol | G02B 6/0018 362/606 |
| 2012/0128254 | A1* | 5/2012 | Nakajima | G06T 1/0021 382/190 |
| 2013/0121681 | A1* | 5/2013 | Lee | H04N 5/2254 396/508 |
| 2014/0331875 | A1 | 11/2014 | Frye et al. | |
| 2015/0037024 | A1* | 2/2015 | Zhou | G02B 5/005 396/510 |
| 2015/0079702 | A1* | 3/2015 | Inoue | H02S 50/15 438/7 |
| 2015/0187980 | A1 | 7/2015 | Yamamoto | |
| 2015/0286340 | A1* | 10/2015 | Send | G01J 1/0437 345/175 |
| 2016/0078270 | A1 | 3/2016 | Lee et al. | |
| 2016/0224816 | A1 | 8/2016 | Smith et al. | |
| 2018/0113200 | A1* | 4/2018 | Steinberg | G08G 1/166 |
| 2018/0260605 | A1 | 9/2018 | Wu et al. | |
| 2019/0026530 | A1 | 1/2019 | Wu et al. | |
| 2019/0179488 | A1* | 6/2019 | Klenkler | G06K 9/0004 |

FOREIGN PATENT DOCUMENTS

| | | |
|---|---|---|
| CN | 106022324 A | 10/2016 |
| CN | 106228147 A | 12/2016 |
| CN | 206058224 U | 3/2017 |
| CN | 106709455 A | 5/2017 |
| CN | 106980850 A | 7/2017 |
| TW | 201504953 A | 2/2015 |

OTHER PUBLICATIONS

Chinese First Office Action issued in Chinese Patent Application No. 201710409886.9, dated Apr. 17, 2019; with English translation.

* cited by examiner

TEXTURE DETECTION DEVICE AND METHOD OF DETECTING A TEXTURE USING THE SAME

This application is a national phase entry under 35 USC 371 of International Patent Application No. PCT/CN2018/074557 filed on Jan. 30, 2018, which claims priority to Chinese Patent Application No. 201710409886.9, filed with Chinese Patent Office on Jun. 2, 2017, titled "A TEXTURE DETECTION DEVICE AND METHOD OF DETECTING A TEXTURE USING THE SAME", which are incorporated herein by reference in its entirety.

TECHNICAL FIELD

The present disclosure relates to the field of display technologies, and in particular, to a texture detection device and a method of detecting a texture using the same.

BACKGROUND

Texture detection technologies (such as fingerprint detection technologies), with their continuous development, are widely used in mobile phones, tablet computers, televisions, access controls, safes and the like. The fingerprint detection technologies may include an optical fingerprint detection technology, a capacitive fingerprint detection technology, and an ultrasonic fingerprint detection technology, among which the optical fingerprint detection technology has a wider detection range and lower cost.

SUMMARY

In an aspect of the present disclosure, a method of detecting a texture using a texture detection device is provided. The texture detection device includes a light guiding layer, at least one light source, a light transmitting hole forming layer, and a photosensitive sensing layer that is located on a side of the light transmitting hole forming layer away from the light guiding layer. The at least one light source is located on at least one side of the light guiding layer. In a texture detection phase, light-shielding regions including a plurality of light transmitting holes are formed in regions of the light transmitting hole forming layer corresponding to a texture detection region, and imaging regions of at least two adjacent light transmitting holes of the plurality of light transmitting holes on the photosensitive sensing layer at least partially overlap.

The method of detecting the texture includes: in each of a plurality of time periods included in the texture detection phase, forming a light-shielding region in the light transmitting hole forming layer, wherein the light-shielding region only includes a part of the plurality of light transmitting holes, and imaging regions of a texture to be detected on the photosensitive sensing layer through the light transmitting hole forming layer do not overlap; in different time periods of the plurality of time periods, positions of parts of the plurality of light transmitting holes included in the light-shielding regions formed in the light transmitting hole forming layer are different; and splicing images of the texture to be detected formed on the photosensitive sensing layer in the plurality of time periods together.

Optionally, the method further includes: before the texture detection phase, determining the texture detection region according to a touch position of the texture to be detected on the texture detection device.

Optionally, the plurality of time periods include two time periods.

Optionally, the texture detection device further includes a display panel disposed between the light transmitting hole forming layer and the photosensitive sensing layer. The method of detecting the texture further includes: in the texture detection phase, controlling the light transmitting hole forming layer to appear completely transparent in a region other than the texture detection region.

Optionally, the light transmitting hole forming layer includes a liquid crystal display panel. The method of detecting the texture further includes: in the texture detection phase, controlling the liquid crystal display panel to display an image in a display region other than the texture detection region.

In a second aspect of the present disclosure, a texture detection device is provided. The texture detection device includes a light guiding layer, at least one light source, a light transmitting hole forming layer, a photosensitive sensing layer disposed on a side of the light transmitting hole forming layer away from the light guiding layer, and a controller. The at least one light source is located on at least one side of the light guiding layer. In a texture detection phase, light-shielding regions including a plurality of light transmitting holes are formed in regions of the light transmitting hole forming layer corresponding to a texture detection region, and imaging regions of at least two adjacent light transmitting holes of the plurality of light transmitting holes on the photosensitive sensing layer at least partially overlap.

The controller is configured to, in each of a plurality of time periods included in the texture detection phase, form a light-shielding region in the light transmitting hole forming layer, wherein the light-shielding region only includes a part of the plurality of light transmitting holes, and imaging regions of a texture to be detected on the photosensitive sensing layer through the light transmitting hole forming layer do not overlap; in different time periods of the plurality of time periods, positions of parts of the plurality of light transmitting holes included in the light-shielding regions formed in the light transmitting hole forming layer are different; and splice images of the texture to be detected formed on the photosensitive sensing layer in the plurality of time periods together.

Optionally, the controller is further configured to, before the texture detection phase, determine the texture detection region according to a touch position of the texture to be detected on the texture detection device.

Optionally, the texture detection device further includes a display panel disposed between the light transmitting hole forming layer and the photosensitive sensing layer. The controller is further configured to, in the texture detection phase, control the light transmitting hole forming layer to appear completely transparent in a region other than the texture detection region.

Optionally, a photosensitive sensor of the photosensitive sensing layer corresponds to a pixel region or a sub-pixel region of the display panel. A ratio of an area of the photosensitive sensor corresponding to each pixel region or each sub-pixel region to an area of each pixel region or each sub-pixel region is greater than or equal to 1:4 and less than or equal to 1:1.

Alternatively, the ratio of the area of the photosensitive sensor corresponding to each pixel region or each sub-pixel region to the area of each pixel region or each sub-pixel region is greater than or equal to about 1:4 and less than or equal to about 1:1.

Optionally, the light transmitting hole forming layer includes a liquid crystal display panel. The controller is further configured to, in the texture detection phase, control the liquid crystal display panel to display an image in a display region other than the texture detection region.

Optionally, the liquid crystal display panel includes a black matrix. An orthographic projection of the black matrix on the light guiding layer covers orthographic projections of photosensitive sensors of the photosensitive sensing layer on the light guiding layer. Light emitted by the at least one light source is infrared light.

Optionally, a size of the light transmitting hole is greater than or equal to 1 μm and less than or equal to 30 μm; or, the size of light transmitting hole is greater than or equal to about 1 μm and less than or equal to about 30 μm.

Optionally, the at least one light source includes a plurality of light sources, and the plurality of light sources are respectively located on a plurality of sides of the light guiding layer.

In yet another aspect of the present disclosure, a controller for use in the above texture detection device is provided. The controller includes a memory and a processor. The memory stores computer instructions executed by the processor. The computer instructions are configured to perform the following method of detecting a texture when the processor is running: in each of a plurality of time periods included in the texture detection phase, forming a light-shielding region in the light transmitting hole forming layer, wherein the light-shielding region only includes a part of the plurality of light transmitting holes, and imaging regions of a texture to be detected on the photosensitive sensing layer through the light transmitting hole forming layer do not overlap; in different time periods of the plurality of time periods, positions of parts of the plurality of light transmitting holes included in the light-shielding regions formed in the light transmitting hole forming layer are different; and splicing images of the texture to be detected formed on the photosensitive sensing layer in the plurality of time periods together.

In yet another aspect of the present disclosure, a non-transitory computer-readable storage medium is provided. The non-transitory computer-readable storage medium stores computer instructions executed by a processor, and the computer instructions are configured to execute the above method of detecting a texture when the processor is running.

In yet another aspect of the present disclosure, a computer program product is provided. The computer program product includes instructions that, when run on a computer, cause the computer to perform the method of detecting a texture as described above.

In yet another aspect of the present disclosure, a computer program is provided that, when loaded into the processor, causes the processor to perform the method of detecting a texture as described above.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be described clearly and completely below with reference to the accompanying drawings. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
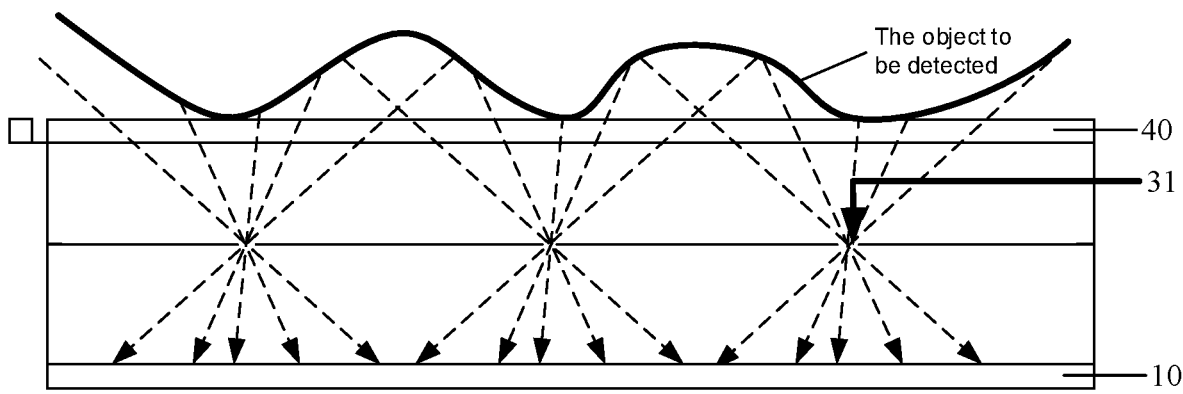
FIG. 1 is a schematic diagram showing imaging of an object to be detected by a texture sensing device.

As shown in FIG. 1, the optical fingerprint detection technology can be realized by the pinhole imaging principle. Light reflected by an object to be detected (e.g., a finger) is imaged on a photosensitive sensing layer 10 through light transmitting holes 31, and thus the problem of imaging blurring caused by light mixing may be solved. There is usually a difference in refractive index between a light guide plate 40 and an external environment. For example, the light guide plate 40 is generally a medium having a refractive index greater than 1.5, and a refractive index of the external environment is 1. Therefore, the light transmitting holes 31 can receive light emitted from a light exit surface of the light guide plate 40 at an angle of 41.8° to 90°.

Figure 2:
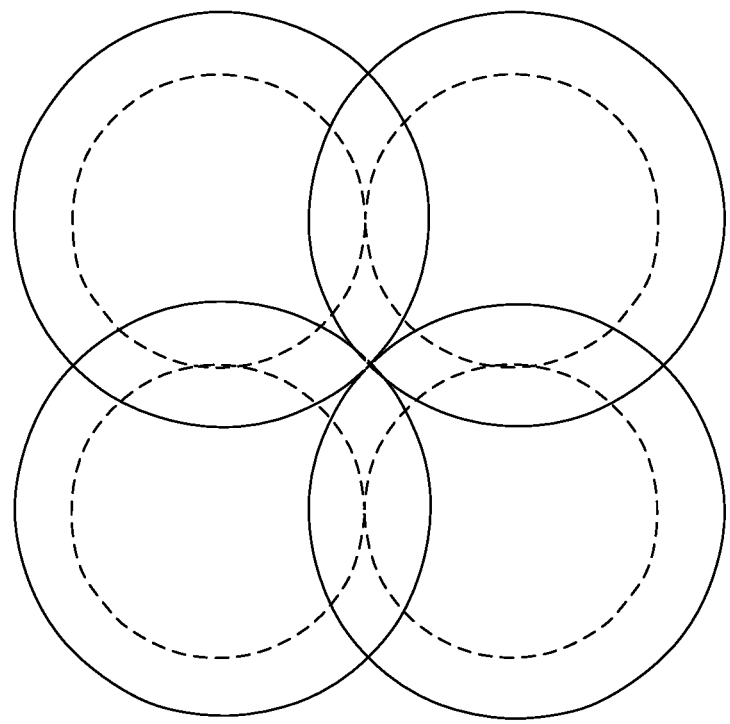
FIG. 2 is a schematic diagram showing a portion of an object to be detected corresponding to each of circular light transmitting holes and imaging of the object to be detected through the circular light transmitting holes.
Figure 3:
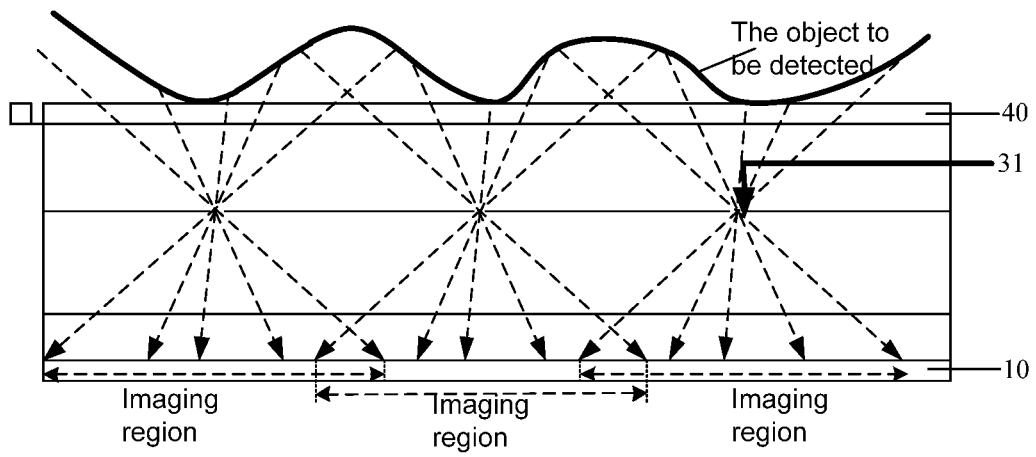
FIG. 3 is a schematic diagram showing imaging of an object to be detected by another texture sensing device.

FIG. 2 is a schematic diagram showing imaging of an object to be detected through circular light transmitting holes. A solid-line area indicates a detectable region of the fingerprint corresponding to each of the light transmitting holes 31, and a dashed-line area indicates a region of an image formed by light through each of the light transmitting holes. As shown in FIG. 2, light reflected by the finger forms a plurality of images on the photosensitive sensing layer through different light transmitting holes 31. In order to avoid missed detection of the fingerprint and overlapping of the plurality of images (the phenomenon of the plurality of images overlapping with each other is shown in FIG. 3), a ratio of an object distance from the finger to the light transmitting holes 31 to an image distance from the light transmitting holes 31 to the photosensitive sensing layer 10 must be set to be greater than or equal to $\sqrt{2}:1$. In this way, an area of an image formed by the fingerprint on the photosensitive sensing layer 10 is at least $\sqrt{2}$ times smaller than an actual area of the fingerprint. In order to display a relatively clearer image, the requirement on the PPI (pixel per inch, or pixel density) of the photosensitive sensing layer 10 will be high. The pixel density is affected by pixel pitch, that is, the larger the spacing between pixels, the smaller the pixel density; otherwise, the larger the pixel density. Experimental data shows that: if the area of the image formed by the fingerprint on the photosensitive sensing layer 10 is reduced by $\sqrt{2}$ times from the actual area of the fingerprint, the fingerprint can be imaged more clearly on the photosensitive sensing layer 10 when the pixel pitch is 10 μm. However, when the pixel pitch is increased to 29 μm, the image formed by the fingerprint on the photosensitive sensing layer 10 is very blurred. A blurred image affects an accuracy of texture detection. However, due to process limitations, it is difficult to fabricate a photosensitive sensing layer 10 having a pixel pitch of 10 μm on the substrate.

Therefore, generally, only by reducing the ratio of the object distance to the image distance, can the area of the image formed by the fingerprint on the photosensitive sensing layer 10 be increased, and thereby achieve clear imaging. However, when the area of the formed image increases, it is easy to cause the images formed by the finger on the photosensitive sensing layer 10 through different light transmitting holes to overlap.

In order to solve the above problem, some embodiments of the present disclosure provide a method of detecting a texture using a texture detection device. This method may effectively lower the requirement on pixel density of the photosensitive sensing layer 10 and ensure that a plurality of images formed on the photosensitive sensing layer 10 do not overlap when the object to be detected is clearly imaged on the photosensitive sensing layer 10.

Figure 4:
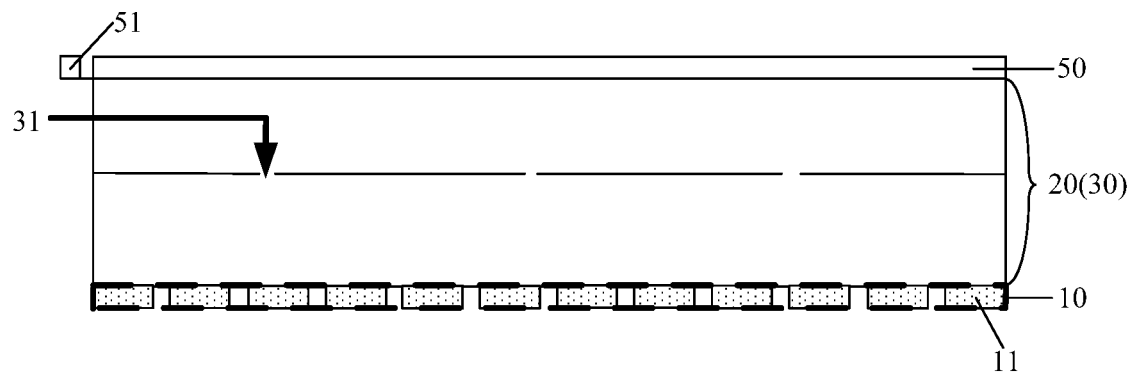
FIG. 4 is a side view of a texture detection device according to some embodiments of the present disclosure.
Figure 5:
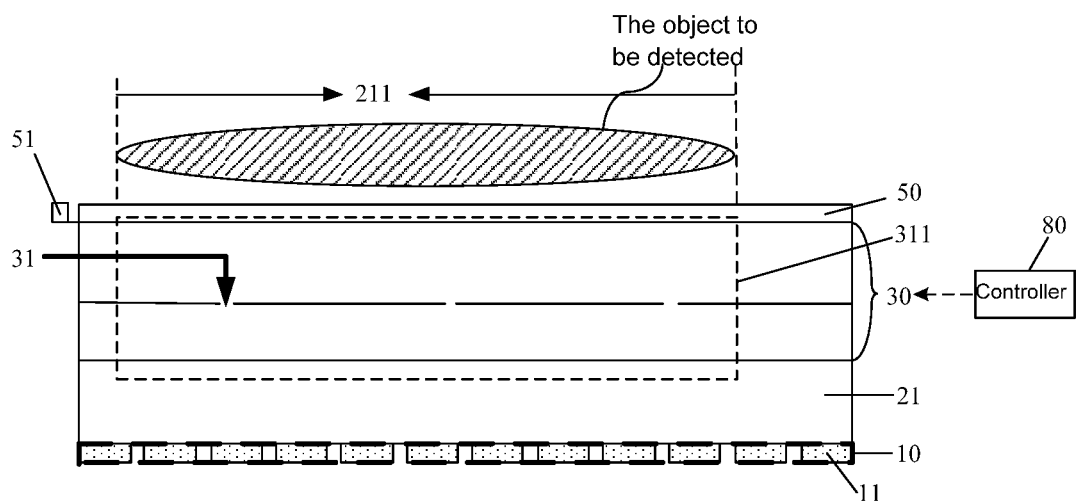
FIG. 5 is a side view of a texture detection device according to some other embodiments of the present disclosure.

As shown in FIGS. 4 and 5, the texture detection device includes a light guiding layer 50, a light source 51 disposed on a side of the light guiding layer 50, a light transmitting hole forming layer 30, and a photosensitive sensing layer 10 disposed on a side of the light transmitting hole forming layer 30 away from the light guiding layer 50. As shown in FIG. 5, in a texture detection phase, light-shielding regions 311 including a plurality of light transmitting holes 31 are formed in regions of the light transmitting hole forming layer 30 corresponding to a texture detection region 211, and imaging regions of light on the photosensitive sensing layer 10 through two adjacent light transmitting holes of the plurality of light transmitting holes 31 are capable of at least partially overlapping.

Figure 6:
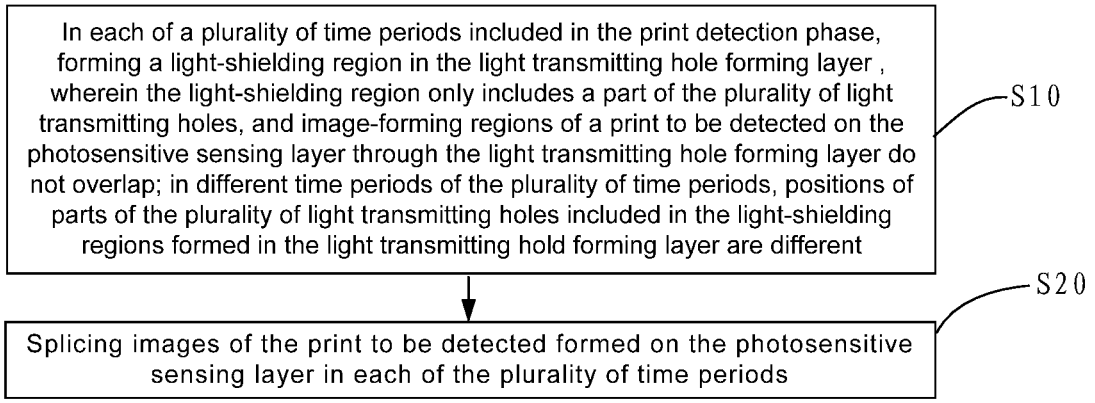
FIG. 6 is schematic flow chart of a method of detecting a texture according to some embodiments of the present disclosure.

As shown in FIG. 6, the method of detecting the texture may be realized by the following steps.

In S10, in each of a plurality of time periods included in the texture detection phase, a light-shielding region 311 is formed in the light transmitting hole forming layer 30, wherein the light-shielding region 311 only includes a part of the plurality of light transmitting holes 31, and imaging regions of a texture to be detected on the photosensitive sensing layer 10 through the light transmitting hole forming layer 30 do not overlap. In different time periods of the plurality of time periods, positions of parts of the plurality of light transmitting holes respectively included in the light-shielding regions 311 formed in the light transmitting hold forming layer 30 are different.

In S20, a plurality of images of the texture to be detected formed on the photosensitive sensing layer 10 in the plurality of time periods are spliced.

In one example of the present disclosure, a light exit angle of the light source 51 can be set so that total reflection occurs in the light guiding layer 50 after light emitted from the light source 51 enters the light guiding layer 50. When the object to be detected touches any position of the light guiding layer 50 of the texture detection device, after the light emitted from the light source 51 enters the light guiding layer 50, total reflection occurs in a region other than a touch position of the object to be detected, and only the total reflection in a region corresponding to the touch position of the object to be detected is destroyed. Light is emitted from a bottom surface of the light guiding layer 50 close to the light transmitting hole forming layer 30, and is incident on the photosensitive sensing layer 10, thereby realizing texture detection. When the object to be detected touches the texture detection device, intensities of reflected light are different after light is reflected by the valleys and ridges of the object to be detected through diffuse reflection. An intensity of light reflected by a valley is lower than an intensity of light reflected by a ridge. Therefore, the photosensitive sensing layer 10 can detect the texture based on a difference between two intensities of light received.

In one example of the present disclosure, an entire screen of the texture detection device is used for texture detection. In another example of the present disclosure, a part of a screen of the texture detection device is used for texture detection.

In some examples of the present disclosure, the texture detection device may be used to detect various objects with a texture, such as a fingerprint and a palm print, which is not limited in the present disclosure.

As shown in FIGS. 4 and 5, each light transmitting hole 31 corresponds to multiple photosensitive sensors 11 of the photosensitive sensing layer 10. The photosensitive sensor 11 is configured to convert an optical signal into an electrical signal. In the embodiments of the present disclosure, an arrangement manner of a plurality of photosensitive sensors 11 of the photosensitive sensing layer 10 is not limited, as long as positions of the plurality of photosensitive sensors 11 meet the following requirements: texture detection can be performed when the object to be detected touches any position on a display side of the texture detection device used for texture detection, and a region occupied by the plurality of photosensitive sensors 11 does not affect normal display of the texture detection device. Adjacent photosensitive sensors 11 may be disposed adjacent to each other (i.e., there is no region for light to come out between the two photosensitive sensors 11), or may be spaced apart (i.e., the two photosensitive sensors 11 are spaced apart by a region for light to come out). In one example of the present disclosure, any two adjacent photosensitive sensors 11 in the texture detection device are spaced apart. In another example of the present disclosure, any two adjacent photosensitive sensors 11 in the texture detection device may be disposed adjacent to each other, or may be spaced apart. If two photosensitive sensors 11 are disposed adjacent to each other, the two photosensitive sensors 11 that are disposed adjacent to each other do not affect the normal display of the texture detection device.

In the embodiments of the present disclosure, a manner in which the light transmitting hole forming layer 30 is formed is not limited, as long as a light shielding region 311 including one or more light transmitting holes 31 can be formed in a region of the light transmitting hole forming layer 30 corresponding to the texture detection region. For example, the light transmitting hole forming layer 30 can be formed by driving liquid crystal with electrodes. It will be understood by those skilled in the art that the light-shielding region 311 formed in the light transmitting hole forming layer 30 refers to: a region of the light transmitting hole forming layer 30, which corresponds to the texture detection region and includes at least one light transmitting hole 31, and in which a region where the light transmitting hole 31 is located is transparent and other regions are opaque. Whether a region of the light transmitting hole forming layer 30 other than the region corresponding to the texture detection region is transparent or not may be determined according to actual needs.

In the embodiments of the present disclosure, an arrangement manner of the plurality of light transmitting holes 31 that can be formed in the light transmitting hole forming layer 30 is not limited. For example, the plurality of light transmitting holes 31 may be arranged in an array or may be arranged irregularly as long as they do not cause missed detection of the texture to be detected.

Figure 7A:
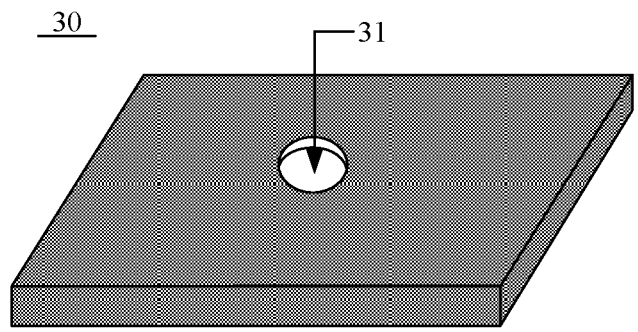
FIG. 7(a) is a schematic diagram of a light transmitting hole according to some embodiments of the present disclosure.
Figure 7B:
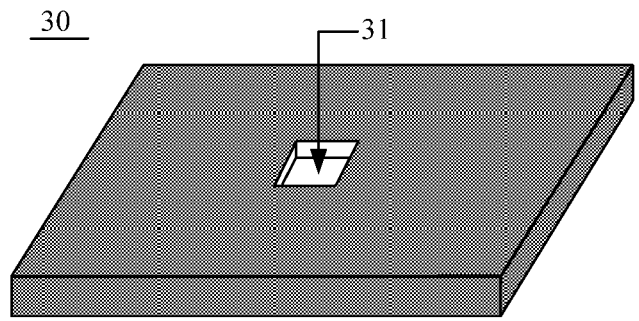
FIG. 7(b) is a schematic diagram of a light transmitting hole according to some other embodiments of the present disclosure.
Figure 7C:
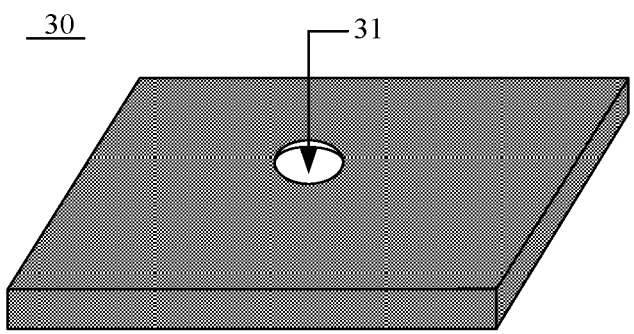
FIG. 7(c) is a schematic diagram of a light transmitting hole according to yet some other embodiments of the present disclosure.
Figure 7D:
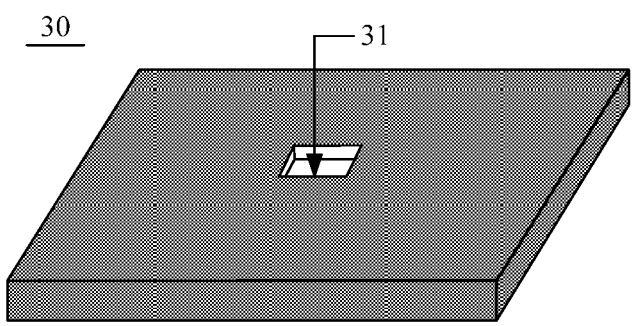
FIG. 7(d) is a schematic diagram of a light transmitting hole according to yet some other embodiments of the present disclosure.

In the embodiments of the present disclosure, a shape of an orthographic projection of the light transmitting hole 31 on the photosensitive sensing layer 10 is not limited. For example, the orthographic projection of the light transmitting hole 31 on the photosensitive sensing layer 10 may be circular (as shown in FIG. 7(a)), square (as shown in FIG. 7(b)), elliptical (as shown in FIG. 7(c)), or rectangular (as shown in FIG. 7(d)).

In one example of the present disclosure, in a case where the orthographic projection of the light transmitting hole 31 on the photosensitive sensing layer 10 is circular, the ratio of the object distance to the image distance may be adjusted to be less than $\sqrt{2:1}$, so that imaging clarity on the photosensitive sensing layer 10 may be improved when the orthographic projection of the light transmitting hole 31 on the photosensitive sensing layer 10 is circular. In a case where the orthographic projection of the light transmitting hole 31 on the photosensitive sensing layer 10 is square, the ratio of the object distance to the image distance may be adjusted to be less than 1:1, so that imaging clarity on the photosensitive sensing layer 10 may be improved when the orthographic projection of the light transmitting hole 31 on the photosensitive sensing layer 10 is square.

Figure 8:
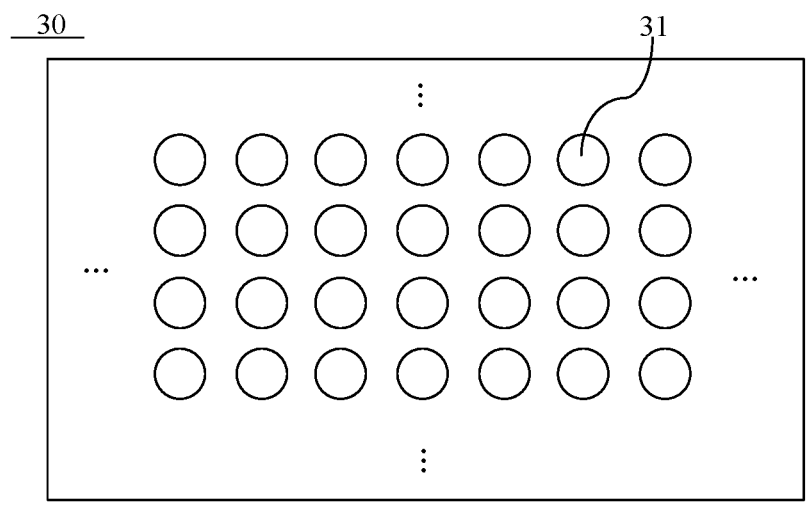
FIG. 8 is a schematic diagram of a plurality of light transmitting holes formed in a light transmitting hole forming layer.

In embodiments of the present disclosure, "imaging regions of at least two adjacent light transmitting holes 31 on the photosensitive sensing layer 10 at least partially overlap" means that: as shown in FIG. 8, when all the light transmitting holes 31 in the light transmitting hole forming layer 30 corresponding to the texture detection region are open, for an image formed on the photosensitive sensing layer 10 through a certain light transmitting hole 31 of all the light transmitting holes 31, an image formed on the photosensitive sensing layer 10 through at least another adjacent light transmitting hole 31 of all the light transmitting holes 31 overlaps with the image.

For example, the plurality of light transmitting holes 31 in the light transmitting hole forming layer 30 are arranged in a matrix. For an image formed on the photosensitive sensing layer 10 through a certain light transmitting hole 31 of the plurality of light transmitting holes 31, horizontally, the image may overlap with image(s) formed on the photosensitive sensing layer 10 through one, two, three, four, or more light transmitting holes 31, and vertically, the image may overlap with image(s) formed on the photosensitive sensing layer 10 through zero, one, two, three, four, or more light transmitting holes 31. Alternatively, horizontally, the image may overlap with image(s) formed on the photosensitive sensing layer 10 through zero, one, two, three, four, or more light transmitting holes 31, and vertically, the image may overlap with image(s) formed on the photosensitive sensing layer 10 through one, two, three, four, or more light transmitting holes 31.

In the embodiments of the present disclosure, a material of the light guiding layer 50 is not limited. For example, the material of the light guiding layer 50 may be light transmitting materials such as polymethyl methacrylate (PMMA), cycloolefin-based thermoplastic resin, polycarbonate (PC), or glass.

Figure 9:
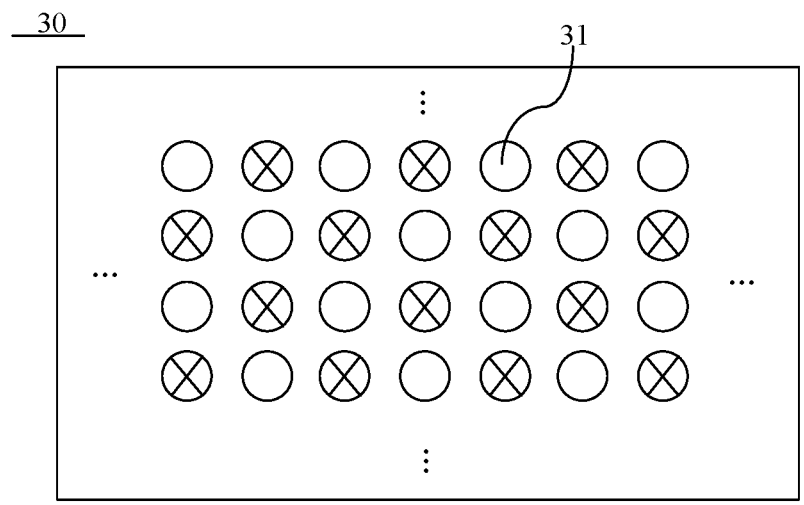
FIG. 9 is a schematic diagram of multiple light transmitting holes formed in a light transmitting hole forming layer in one of a plurality of time periods included in a texture detection phase according to some embodiments of the present disclosure.

In embodiments of the present disclosure, on a basis that in each of the plurality of time periods, imaging regions of the texture to be detected on the photosensitive sensing layer 10 through the light transmitting hole forming layer 30 do not overlap and the entire object to be detected is detected, the light transmitting hole forming layer 30 may be controlled in the plurality of time periods in the texture detection phase in a way that in each of the plurality of time periods, the light-shielding region 311 formed in the light transmitting hole forming layer 30 only includes a part of the plurality of light transmitting holes. For example, the plurality of time periods include two time periods (as shown in FIG. 9), or include three time periods, four time periods, etc.

On this basis, when carrying out texture detection, the texture detection device may complete a texture detection process by only single imaging, or by multiple imaging. That is, when texture detection is completed by single imaging, the light transmitting hole 31 is formed only once at a same position of the light transmitting hole forming layer 30. When texture detection is completed by multiple imaging, a same light transmitting hole 31 is formed for multiple times at the same position of the light transmitting hole forming layer 30. Correspondingly, the image is formed for multiple times at a same position of the photosensitive sensing layer 10 through the light transmitting hole forming layer 30, and a clearest image is selected for splicing.

Figure 10:
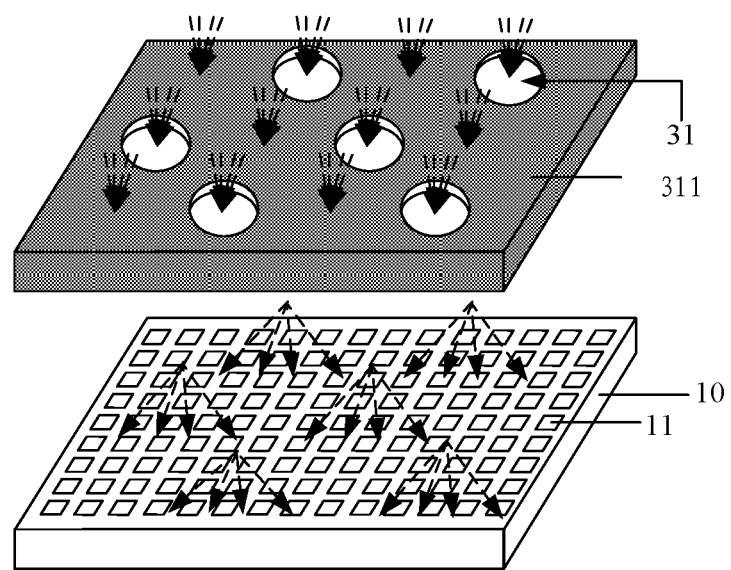
FIG. 10 is a schematic diagram showing imaging of light on a photosensitive sensing layer through an light transmitting hole forming layer according to some embodiments of the present disclosure.

In embodiments of the present disclosure, "in each of the plurality of time periods, imaging regions of the texture to be detected on the photosensitive sensing layer 10 through the light transmitting hole forming layer 30 do not overlap" means that: as shown in FIG. 10, in a certain time period of the plurality of time periods, there is only one light transmitting hole in a light-shielding region formed in this time period; or, there are multiple light transmitting holes in the light-shielding region formed in this time period, but an image formed on the photosensitive sensing layer 10 through any one light transmitting hole 31 of the multiple light transmitting holes does not overlap with an image formed on the photosensitive sensing layer 10 through any other light transmitting hole 31 of multiple light transmitting holes in a same time period (in FIG. 10, an example is taken in which the plurality of time periods include two time periods).

In the embodiments of the present disclosure, "images formed on the photosensitive sensing layer 10 in each of the plurality of time periods are spliced" means that: a plurality of images formed in the plurality of time periods are spliced together to form a complete image of the object to be detected formed through the light transmitting hole forming layer 30.

Figure 11A:
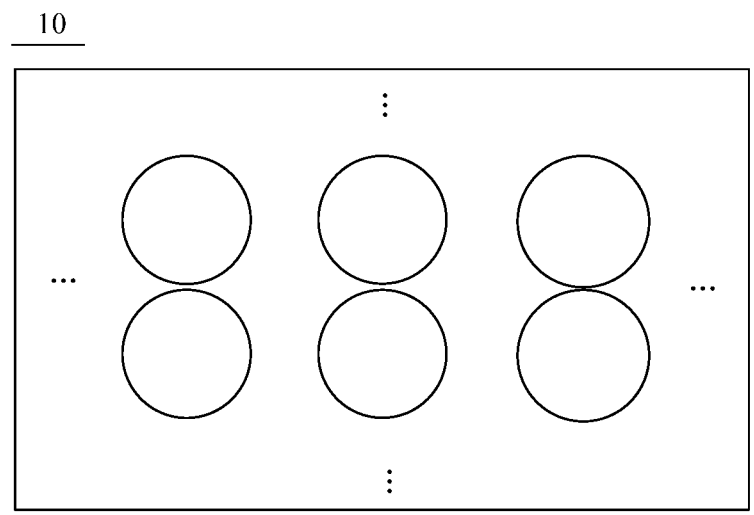
FIG. 11(a) is a schematic diagram showing imaging on a photosensitive sensing layer in a first time period according to some embodiments of the present disclosure.
Figure 11B:
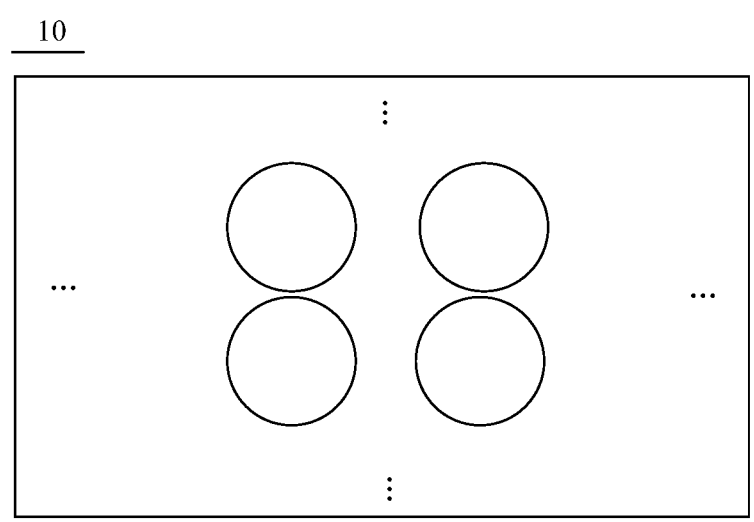
FIG. 11(b) is a schematic diagram showing imaging on a photosensitive sensing layer in a second time period according to some embodiments of the present disclosure.
Figure 11C:
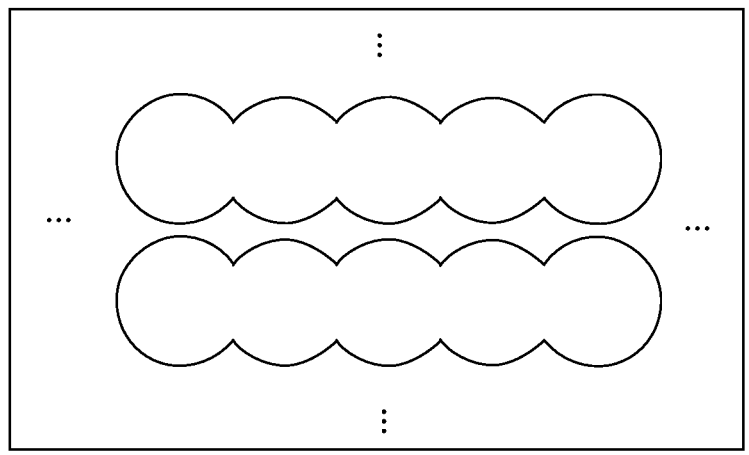
FIG. 11(c) is a schematic diagram of an image formed after splicing FIG. 11(a) and FIG. 11(b) together.

In one example of the present disclosure, FIG. 11(a) shows images of the object to be detected, which are formed through the light transmitting hole forming layer 30 in a first time period and do not overlap with each other, and FIG. 11(b) shows images of the object to be detected, which are formed through the light transmitting hole forming layer 30 in a second time period and do not overlap. FIG. 11(c) shows a complete image formed by splicing the images formed in the first time period and the second time period together (in FIG. 11(a) to FIG. 11(c), an example is taken in which the plurality of time periods include two time periods).

By the method of detecting the texture using the texture detection device provided by the embodiments of the present disclosure, the texture detection may be performed while the display is performed. During the process of texture detection, an area of an image of the object to be detected formed on the photosensitive sensing layer 10 through the light transmitting hole forming layer 30 may be increased, so that the object to be detected may be clearly imaged on the photosensitive sensing layer 10. However, as the area of the image increases, imaging regions of two adjacent light transmitting holes 31 on the photosensitive sensing layer 10 may partially overlap. Therefore, in the texture detection phase, the light transmitting hole forming layer 30 is controlled in the plurality of time periods in the way that in each of the plurality of time periods, a light-shielding region 311 formed in a region of the light transmitting hole forming layer 30 corresponding to the texture detection region includes only a part of the plurality of light transmitting holes 31. A plurality of light-shielding regions 311 formed in the plurality of time periods are different from each other, and in each of the plurality of time periods, imaging regions of the texture to be detected on the photosensitive sensing layer 10 through the light transmitting hole forming layer 30 do not overlap. Images of the texture to be detected formed on the photosensitive sensing layer 10 in the plurality of time periods are spliced together, thus completing the texture detection process. In this way, when the object to be detected is clearly imaged on the photosensitive sensing layer 10, the requirement on pixel density of the photosensitive sensing layer 10 is lowered.

Figure 12A:
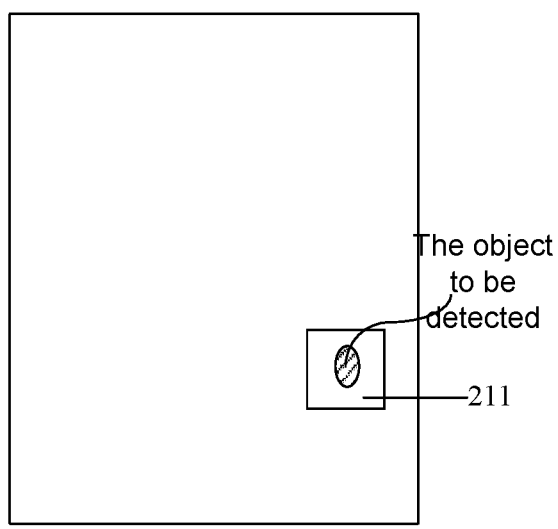
FIG. 12(a) is a top view of a texture detection device according to some embodiments of the present disclosure.
Figure 12B:
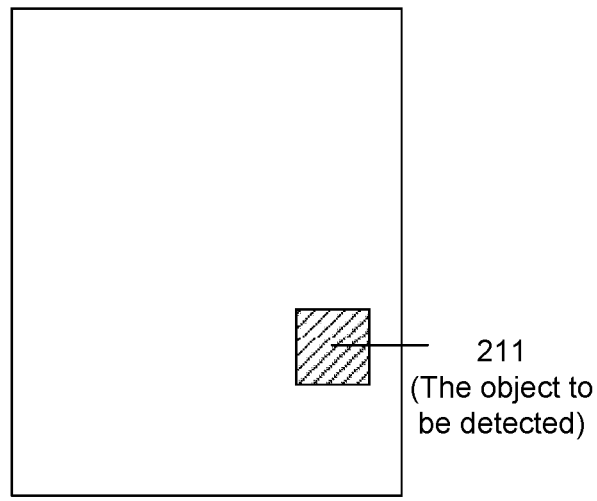
FIG. 12(b) is a top view of a texture detection device according to some other embodiments of the present disclosure.

In some embodiments of the present disclosure, as shown in FIGS. 12(a) and 12(b), the method further includes: before the texture detection phase, determining the texture detection region 211 according to a touch position of the texture to be detected on the texture detection device.

In some examples of the present disclosure, the texture detection device is realized by using a touch control structure: the texture detection region 211 is determined according to the touch position of the texture to be detected on the texture detection device, and then a region of the light transmitting hole forming layer 30 corresponding to the texture detection region 211 is made to form a light-shielding region 311 in each of the plurality of time periods to realize texture detection. Positions of light transmitting holes in each of the plurality of light-shielding regions 311 do not overlap.

For example, the touch control structure may be a capacitive type touch control structure or a resistive type touch control structure. In another example, if the texture detection device further includes a display panel, in a case where the touch control structure is a capacitive type touch control structure, the capacitive type touch control structure may be an In-Cell touch structure, an On-Cell touch structure, or a One Glass Solution (OGS) structure; in a case where the touch control structure is a resistive type touch control structure, the resistive type touch control structure may be a four-wire resistive type touch control structure or a five-wire resistive type touch control structure.

In some embodiments of the present disclosure, the object to be detected is completely within the texture detection region 211.

For example, as shown in FIG. 12(a), the object to be detected is completely within the texture detection region 211, and an area of the object to be detected is smaller than an area of the texture detection region 211. Alternatively, as shown in FIG. 12(b), the object to be detected is completely within the texture detection region 211, and the area of the object to be detected is equal to the area of the texture detection region 211.

In some embodiments of the present disclosure, in a case where the entire screen of the texture detection device is used for texture detection, in order to not affect normal operation of other regions on the screen of the texture detection device other than the texture detection region 211, the texture detection region 211 may be first determined according to the touch position of the object to be detected on the screen of the texture detection device, and texture detection may only be carried out within the texture detection region 211.

In one example of the present disclosure, as shown in FIG. 10, the texture detection phase includes two time periods, and in each of the two time periods, a light-shielding region 311 is formed in a region of the light transmitting hole forming layer 30 corresponding to the texture detection region 211. Light transmitting holes respectively formed in the two time periods will not be formed at a same position. In each of the two time periods, imaging regions of the texture to be detected on the photosensitive sensing layer 10 through the light transmitting hole forming layer 30 do not overlap.

In a case where light-shielding regions are respectively formed in two time periods, imaging clarity on the photosensitive sensing layer 10 may be improved, and time may be saved compared with other examples in which light-shielding regions are respectively formed in more time periods.

In some embodiments of the present disclosure, as shown in FIG. 5, the texture detection device further includes a display panel 21 disposed between the light transmitting hole forming layer 30 and the photosensitive sensing layer 10, and the method of detecting the texture further includes: in the texture detection phase, controlling the light transmitting hole forming layer 30 to appear completely transparent in a region other than the texture detection region 211.

In some examples of the present disclosure, the display panel 21 may be a liquid crystal display panel or an Organic Light-Emitting Diode (OLED) display panel.

For example, in a case where the display panel 21 is a liquid crystal display panel, the liquid crystal display panel includes an array substrate, an assembling substrate, and a liquid crystal layer disposed therebetween. The array substrate may include Thin Film Transistors (TFTs), and pixel electrode(s) electrically connected to drain electrodes of TFTs. Further, the display panel 21 may for example also include common electrode(s) disposed in the array substrate or the assembling substrate.

For example, in a case where the display panel 21 is an OLED display panel, the display panel 21 includes an array substrate and an encapsulating substrate. The array substrate may include TFTs, anode electrodes and cathode electrodes that are electrically connected to drain electrodes of the TFTs respectively, and an organic material functional layer disposed between the anode electrodes and the cathode electrodes.

In some embodiments of the present disclosure, in the texture detection phase, the light transmitting hole forming layer 30 appears completely transparent in a region other than the texture detection region 211, and thus a display region of the display panel 21 other than the texture detection region 211 may display an image without being affected.

Figure 13A:
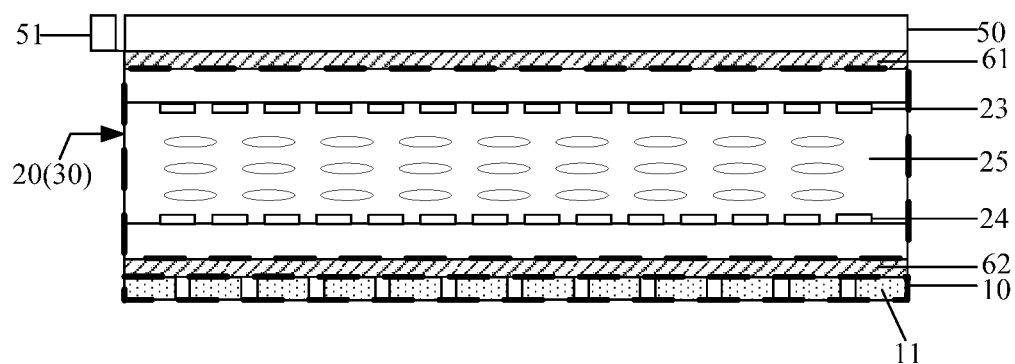
FIG. 13(a) is a schematic diagram showing a structure of a texture detection device according to some embodiments of the present disclosure.

In some embodiments of the present disclosure, as shown in FIGS. 4 and 13(a), the light transmitting hole forming layer 30 is a liquid crystal display panel 20, and the method of detecting the texture further includes: in the texture detection phase, controlling the liquid crystal display panel 20 to display an image in a display region other than the texture detection region 211.

Figure 13B:
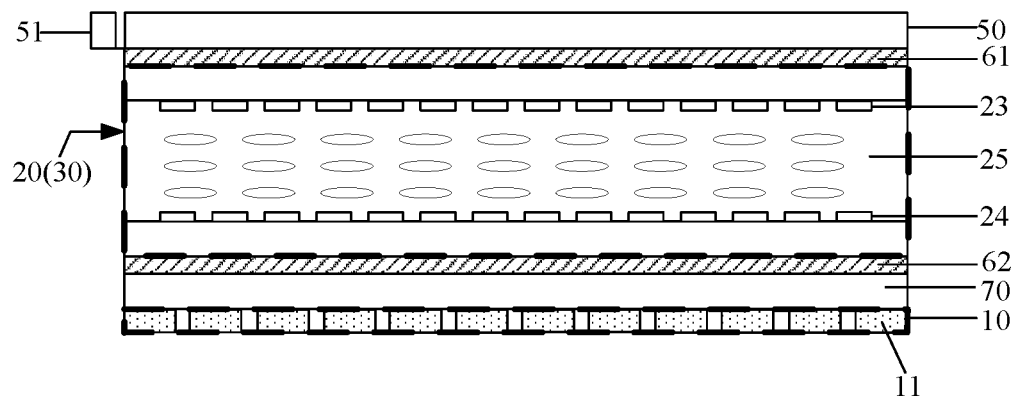
FIG. 13(b) is a schematic diagram showing a structure of a texture detection device according to some other embodiments of the present disclosure.

In some embodiments of the present disclosure, as shown in FIG. 13(b), the texture detection device may further include a support substrate 70 disposed on a side of the liquid crystal display panel 20 away from the light guiding layer 50. The photosensitive sensing layer 10 is disposed on a side of the support substrate 70 away from the liquid crystal display panel 20.

In this way, the problem that the area of the image formed by the object to be detected on the photosensitive sensing layer 10 through the light transmitting hole 30 is relatively small because a distance between the light transmitting hole forming layer 30 and the photosensitive sensing layer 10 is relatively small in a case where the light transmitting hole forming layer 30 is a liquid crystal display panel 20 may be avoided.

For example, in the case where the display panel 20 is the liquid crystal display panel, the common electrode(s) 23 and the pixel electrode(s) 24 in the liquid crystal display panel drive the liquid crystal layer 25 so that a light-shielding region 311 is formed in a region of the light transmitting hole forming layer 30 corresponding to the texture detection region 211. This technology is mature, and it allows a display region of the texture detection device other than the texture detection region 211 to display an image without being affected, thereby simplifying the process.

Some embodiments of the present disclosure further provide a texture detection device. As shown in FIGS. 4 and 5, the texture detection device includes a light guiding layer 50, a light source 51 disposed on a side of the light guiding layer 50, a light transmitting hole forming layer 30, a photosensitive sensing layer 10 disposed on a side of the light transmitting hole forming layer 30 away from the light guiding layer 50, and a controller 80. In the texture detection phase, light-shielding regions 311 including a plurality of light transmitting holes 31 are formed in regions of the light transmitting hole forming layer 30 corresponding to the texture detection region 211, and imaging regions of at least two adjacent light transmitting holes 31 of the plurality of light transmitting holes on the photosensitive sensing layer 10 at least partially overlap. The controller 80 is configured to, in each of a plurality of time periods included in the texture detection phase, form a light-shielding region 311 in the light transmitting hole forming layer, wherein the light-shielding region only includes a part of the plurality of light transmitting holes, and imaging regions of a texture to be detected on the photosensitive sensing layer 10 through the light transmitting hole forming layer 30 do not overlap. In different time periods of the plurality of time periods, positions of parts of the plurality of light transmitting holes included in the light-shielding regions 311 formed in the light transmitting hole forming layer 30 are different. The controller 80 is further configured to splice images of the texture to be detected formed on the photosensitive sensing layer 10 in each of the plurality of time periods together.

In some embodiments of the present disclosure, the light exit angle of the light source 51 can be set so that total reflection occurs in the light guiding layer 50 after light emitted from the light source 51 enters the light guiding layer 50. When the object to be detected touches any position of the light guiding layer 50 of the texture detection device, after the light emitted from the light source 51 enters the light guiding layer 50, total reflection occurs in a region other than the touch position of the object to be detected, and only the total reflection in the region corresponding to the touch position of the object to be detected is destroyed. The light is emitted from the bottom surface of the light guiding layer 50 close to the light transmitting hole forming layer 30, and is incident on the photosensitive sensing layer 10, thereby realizing texture detection. When the object to be detected touches the texture detection device, intensities of reflected light are different after light is reflected by the valleys and ridges of the object to be detected through diffuse reflection. The intensity of light reflected by a valley is lower than the intensity of light reflected by a ridge. Therefore, the photosensitive sensing layer 10 can perform texture detection based on the difference between two intensities of light received.

In one example of the present disclosure, the entire screen of the texture detection device is used for texture detection. In another example of the present disclosure, a part of the screen of the texture detection device is used for texture detection.

The texture detection device provided by the embodiments of the present disclosure is able to perform texture detection while displaying. During the process of texture detection, the area of the image of the object to be detected formed on the photosensitive sensing layer 10 through the light transmitting hole forming layer 30 may be increased, so that the object to be detected may be clearly imaged on the photosensitive sensing layer 10. However, as the area of the image increases, imaging regions of two adjacent light transmitting holes 31 on the photosensitive sensing layer 10 may partially overlap. Therefore, in the texture detection device provided by the embodiments of the present disclosure, in each of the plurality of time periods included in the texture detection phase, the light-shielding region 311 formed in a region of the light transmitting hole forming layer 30 corresponding to the texture detection region includes only a part of the plurality of light transmitting holes 31. Moreover, in each of the plurality of time periods, imaging regions of the texture to be detected on the photosensitive sensing layer 10 through the light transmitting hole forming layer 30 do not overlap. Images of the texture to be detected formed on the photosensitive sensing layer 10 in each of the plurality of time periods are then spliced together, thus completing the texture detection process. In this way, when the object to be detected is clearly imaged on the photosensitive sensing layer 10, the requirement on pixel density of the photosensitive sensing layer 10 is lowered.

In some embodiments of the present disclosure, as shown in FIGS. 12(a) and 12(b), the controller 80 is further configured to, before the texture detection phase, determine the texture detection region 211 according to the touch position of the texture to be detected on the texture detection device.

In some examples of the present disclosure, the texture detection device is realized by using a touch control structure: the texture detection region 211 is determined according to the touch position of the texture to be detected on the texture detection device, and then the region of the light transmitting hole forming layer 30 corresponding to the texture detection region 211 is made to form a different light-shielding region 311 in each of the plurality of time periods. Images of the texture to be detected formed through each of the light-shielding regions 311 are then formed and spliced together to realize texture detection. Here, with "a different light-shielding region 311", it means that the positions of light transmitting holes included in different light-shielding regions 311 do not overlap.

For example, the touch control structure may be a capacitive type touch control structure or a resistive type touch control structure. In another example, if the texture detection device further includes a display panel 21, in the case where the touch control structure is a capacitive type touch control structure, the capacitive type touch control structure may be an In-Cell touch structure, an On-Cell touch structure, or a One Glass Solution (OGS) structure; in the case where the touch control structure is a resistive type touch control structure, the resistive type touch control structure may be a four-wire resistive type touch control structure or a five-wire resistive type touch control structure.

In some embodiments of the present disclosure, the object to be detected is completely within the texture detection region 211. For example, as shown in FIG. 12(a), the object to be detected is completely within the texture detection region 211, and the area of the object to be detected is smaller than the area of the texture detection region 211. As shown in FIG. 12(b), the object to be detected is completely within the texture detection region 211, and the area of the object to be detected is equal to the area of the texture detection region 211.

In some embodiments of the present disclosure, in the case where the entire screen of the texture detection device is used for texture detection, in order to not affect normal operation of other regions on the screen of the texture detection device other than the texture detection region 211, the texture detection region 211 is first determined according to the touch position of the texture to be detected on the screen of the texture detection device, and texture detection is only carried out within the texture detection region 211.

In some embodiments of the present disclosure, as shown in FIG. 5, the texture detection device further includes a display panel 21 disposed between the light transmitting hole forming layer 30 and the photosensitive sensing layer 10, and the controller 80 is further configured to, in the texture detection phase, control the light transmitting hole forming layer 30 to appear completely transparent in a region other than the texture detection region 211.

In the texture detection phase, in a case where the controller 80 controls the light transmitting hole forming layer 30 to appear completely transparent in a region other than the texture detection region 211, a display region of the display panel 21 other than the texture detection region 211 may display an image without being affected.

Figure 14A:
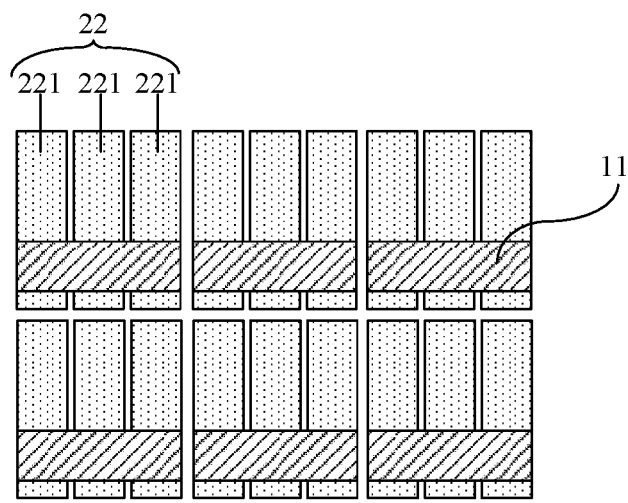
FIG. 14(a) is a schematic diagram of an arrangement manner of a plurality of photosensitive sensors according to some embodiments of the present disclosure.
Figure 14B:
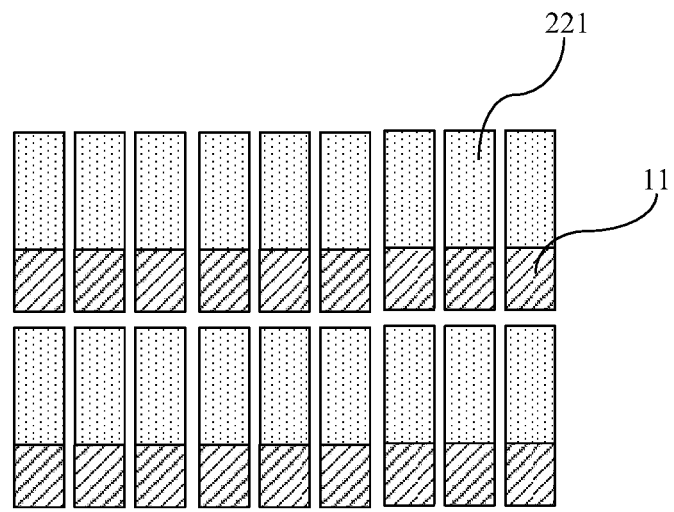
FIG. 14(b) is a schematic diagram of an arrangement manner of a plurality of photosensitive sensors according to some other embodiments of the present disclosure.

In some embodiments of the present disclosure, a photosensitive sensor 11 of the photosensitive sensing layer 10 corresponds to a pixel region 22 (as shown in FIG. 14(a)) or a sub-pixel region 221 (as shown in FIG. 14(b)) of the display panel 21. A ratio of an area of a photosensitive sensor 11 corresponding to each pixel region 22 or each sub-pixel region 221 to an area of each pixel region 22 or each sub-pixel region 221 is greater than or equal to 1:4 and less than or equal to 1:1.

In some embodiments of the present disclosure, the ratio of the area of the photosensitive sensor 11 corresponding to each pixel region 22 or each sub-pixel region 221 to the area of each pixel region 22 or each sub-pixel region 221 is greater than or equal to about 1:4 and less than or equal to about 1:1. For a color display device, the pixel region 22 refers to a minimum repeating region in which a plurality of colors can be displayed, and the sub-pixel region 221 refers to a sub-region in the pixel region 22 for displaying a primary color. The pixel region 22 generally includes at least three sub-pixel regions 221. For example, the three sub-pixel regions 221 may be a red sub-pixel region, a green sub-pixel region, and a blue sub-pixel region; or, the pixel region 22 may be a region including, at least, one red sub-pixel region, one green sub-pixel region, and one blue sub-pixel region.

For a monochromatic display device, the pixel region 22 only includes one sub-pixel region 221, and a size of the pixel region 22 is a size of the sub-pixel region 221.

In some embodiments of the present disclosure, the photosensitive sensor 11 may be in one-to-one correspondence with each pixel region 22 or each sub-pixel region 221 in the display panel 21, or the photosensitive sensor 11 may be disposed within a part of pixel regions 22 or a part of sub-pixel regions 221 in the display panel 21, so that a size of a region in which the plurality of photosensitive sensors 11 are located is large enough for texture detection.

In some embodiments of the present disclosure, a photosensitive sensor 11 is disposed within a pixel region 22 or a sub-pixel region 221 in the display panel 21, so that the photosensitive sensors 11 are evenly arranged in the display panel 21. A ratio of an area occupied by each photosensitive sensor 11 to the area of the pixel region 22 or the sub-pixel region 221 is greater than or equal to 1:4 and less than or equal to 1:1. Within this ratio range, when the texture detection device is used for display, the texture detection device may normally display an image without being affected by a decrease in aperture ratio caused by the provision of the photosensitive sensors 11.

In some embodiments of the present disclosure, as shown in FIGS. 4 and 13(a), the light transmitting hole forming layer 30 is a liquid crystal display panel, and the controller 80 is further configured to, in the texture detection phase, control the liquid crystal display panel to display an image in a display region other than the texture detection region 211.

In some embodiments of the present disclosure, as shown in FIG. 13(b), the texture detection device may further include a support substrate 70 disposed on a side of the liquid crystal display panel 20 away from the light guiding layer 50. The photosensitive sensing layer 10 is disposed on a side of the support substrate 70 away from the display panel 20.

In this way, the problem that the area of the image of the object to be detected formed on the photosensitive sensing layer 10 through the light transmitting hole 30 is relatively small because a distance between the light transmitting hole 31 and the photosensitive sensing layer 10 is relatively small in a case where the light transmitting hole forming layer 30 is a liquid crystal display panel 20 may be avoided.

Of course, in some embodiments of the present disclosure, the texture detection device may further include an upper polarizer 61 disposed on the liquid crystal display panel 20 close to the light guiding layer 50, and a lower polarizer 62 disposed opposite to the upper polarizer 61. In a case where the positions of transmission axes of the upper polarizer 61 and the lower polarizer 62 are different, the light transmitting hole forming layer 30 has a different operation mode. For example, there are at least two situations:

In a first situation: the transmission axes of the upper polarizer 61 and the lower polarizer 62 are designed to be perpendicular to each other.

In a case where the light transmitting holes 31 are formed in the light transmitting hole forming layer 30 using a Twisted Nematic (TN) technology, the light transmitting hole forming layer 30 is substantially in a completely transparent state when no electrical field is applied, and is substantially in a completely opaque state when an electrical field is applied. When the light-shielding region 311 including at least one light transmitting hole 31 is formed in a region of the light transmitting hole forming layer 30 corresponding to the texture detection region 211, there is no voltage between the common electrode 23 and the pixel electrode 24 within a region where the at least one light transmitting hole 31 is located, so that the region where the light transmitting hole 31 is located allows light to pass through; in a region of the light transmitting hole forming layer 30 other than the region where the light transmitting hole 31 is located, there is a voltage between the common electrode 23 and the pixel electrode 24, and the region other than the region where the light transmitting hole 31 is located is shielded through the voltage, that is, light is not allowed to pass therethrough.

In a case where the light transmitting holes 31 are formed in the light transmitting hole forming layer 30 using an Advanced Super Dimension Switch (ADS) technology, the light transmitting hole forming layer 30 is in an opaque state when no electrical field is applied, and is in a transparent state when an electrical field is applied. When the light-shielding region 311 including at least one light transmitting hole 31 is formed in a region of the light transmitting hole forming layer 30 corresponding to the texture detection region 211, there is a voltage between the common electrode 23 and the pixel electrode 24 in a region where the at least one light transmitting hole 31 is located, and the voltage makes the region where the light transmitting hole is located allow light to pass through; in a region of the light transmitting hole forming layer 30 other than the region where the light transmitting hole 31 is located, there is no voltage between the common electrode 23 and the pixel electrode 24, so that the region other than the region where the light transmitting hole 31 is located is shielded.

In a second situation: the transmission axes of the upper polarizer 61 and the lower polarizer 62 are designed to be parallel to each other.

In a case where the light transmitting holes 31 are formed in the light transmitting hole forming layer 30 using the TN technology, the light transmitting hole forming layer 30 is in an opaque state when no electric field is applied, and is in a transparent state when an electrical field is applied. When the light-shielding region 311 including at least one light transmitting hole 31 is formed in a region of the light transmitting hole forming layer 30 corresponding to the texture detection region 211, there is a voltage between the common electrode 23 and the pixel electrode 24 in a region where the at least one light transmitting hole 31 is located, and the voltage makes the region where the light transmitting hole 31 is located allow light to pass through; in a region of the light transmitting hole forming layer 30 other than the region where the light transmitting hole 31 is located, there is no voltage between the common electrode 23 and the pixel electrode 24, so that the region other than the region where the light transmitting hole 31 is located is shielded.

In a case where the light transmitting holes 31 are formed in the light transmitting hole forming layer 30 using the ADS technology, the light transmitting hole forming layer 30 is in a transparent state when no electrical field is applied, and is in an opaque state when an electrical field is applied. When the light-shielding region 311 including at least one light transmitting hole 31 is formed in a region of the light transmitting hole forming layer 30 corresponding to the texture detection region 211, there is no voltage between the common electrode 23 and the pixel electrode 24 in a region where the at least one light transmitting hole 31 is located, so that the region where the light transmitting hole 31 is located allows light to pass through; in a region of the light transmitting hole forming layer 30 other than the region where the light transmitting hole 31 is located, there is a voltage between the common electrode 23 and the pixel electrode 24, so that the region other than the region where the light transmitting hole 31 is located is shielded.

In the case where the display panel 21 is a liquid crystal display panel, the common electrode(s) 23 and the pixel electrode(s) 24 in the liquid crystal display panel drive the liquid crystal layer 25 in the way that a light-shielding region 311 including at least one light transmitting hole 31 is formed in the light transmitting hole forming layer 30 within the texture detection region 211. This technology is mature, and it allows a display region of the texture detection device other than the texture detection region 211 to display an image without being affected, thereby simplifying the process.

Figure 14C:
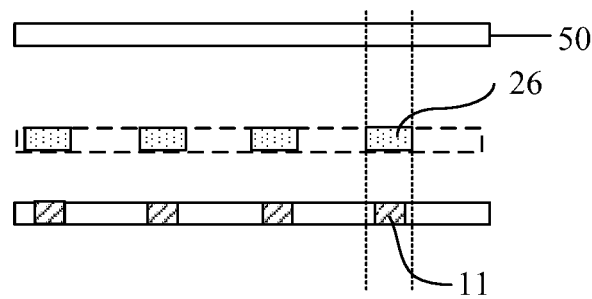
FIG. 14(c) is a schematic diagram showing a relative position of a black matrix and photosensitive sensors according to some embodiments of the present disclosure.

In some embodiments of the present disclosure, the display panel 20 includes a black matrix 26. As shown in FIG. 14(c), an orthographic projection of the black matrix 26 on the light guiding layer 50 covers orthographic projections of the photosensitive sensors 11 of the photosensitive sensing layer 10 on the light guiding layer 50. Light emitted by the light source 51 is infrared light.

Since the infrared light has a strong penetrating power, it may be incident on the photosensitive sensing layer 10 through the black matrix 26.

In the above embodiments of the present disclosure, the orthographic projection of the black matrix 26 on the light guiding layer 50 covers the orthographic projections of the photosensitive sensors 11 of the photosensitive sensing layer 10 on the light guiding layer 50, so that the aperture ratio of the texture detection device while being used for display is not affected.

In some embodiments of the present disclosure, considering that if the size of the light transmitting hole 31 is too small, it is easy to cause diffraction when light passes through the light-transmitting hole 31, the size of light transmitting hole 31 is designed to be greater than or equal to 1 μm and less than or equal to 30 μm.

In some other embodiments of the present disclosure, the size of light transmitting hole 31 is designed to be greater than or equal to about 1 μm and less than or equal to about 30 μm.

In some embodiments of the present disclosure, as shown in FIGS. 15(a)-15(d), a plurality of light sources 51 are provided and are respectively disposed on a plurality of sides of the light guiding layer 50.

Figure 15A:
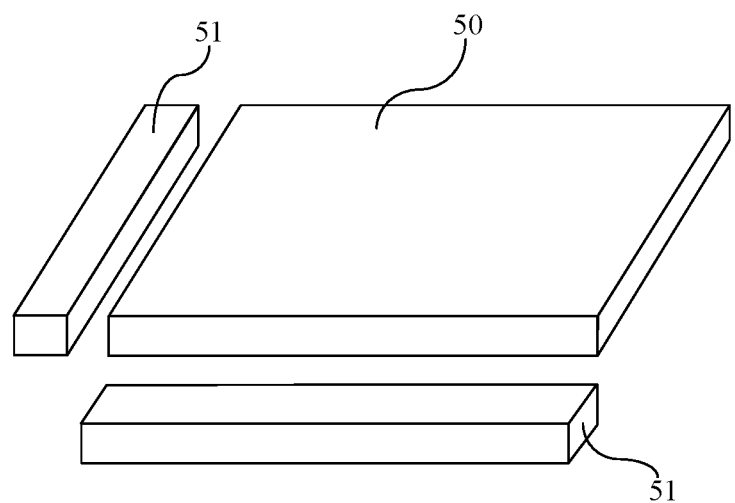
FIG. 15(a) is a schematic diagram showing a structure of a light guiding layer and light sources according to some embodiments of the present disclosure.
Figure 15B:
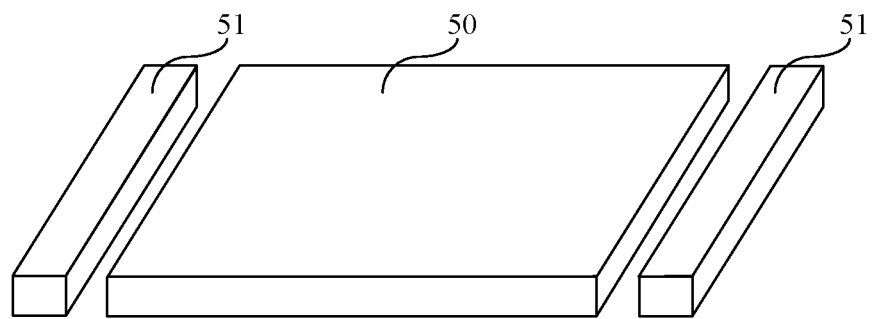
FIG. 15(b) is a schematic diagram showing a structure of a light guiding layer and light sources according to some other embodiments of the present disclosure.
Figure 15C:
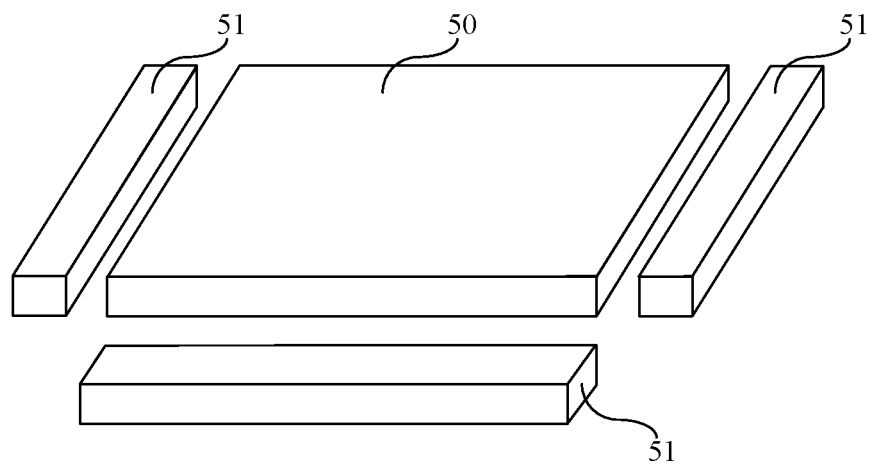
FIG. 15(c) is a schematic diagram showing a structure of a light guiding layer and light sources according to yet some other embodiments of the present disclosure.
Figure 15D:
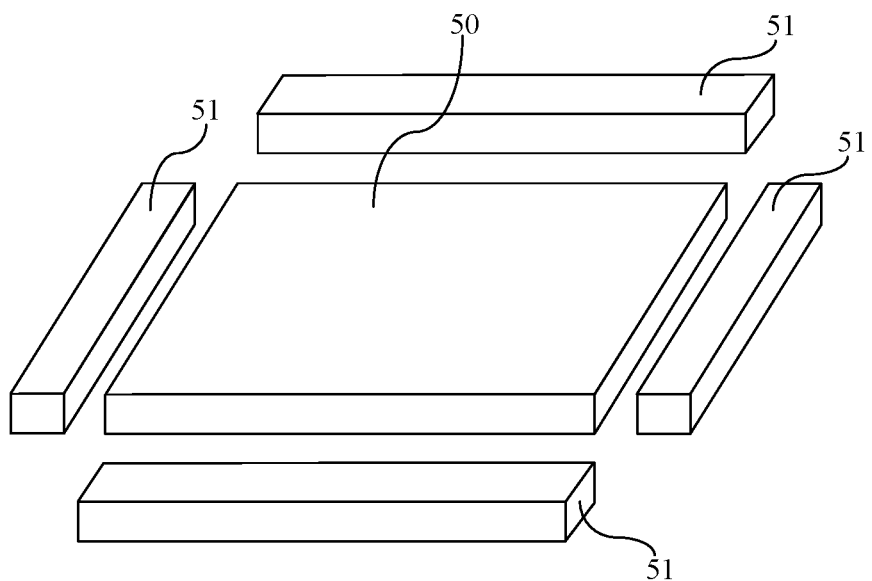
FIG. 15(d) is a schematic diagram showing a structure of a light guiding layer and light sources according to yet some other embodiments of the present disclosure.

In an embodiments of the present disclosure, two light sources 51 are provided, and the two light sources 51 are respectively disposed on two adjacent sides (as shown in FIG. 15(a)), or respectively disposed on two opposite sides (as shown in FIG. 15(b)), of the light guiding layer 50. In another embodiment of the present disclosure, three light sources 51 are provided, and the three light sources 51 are respectively disposed on three sides of the light guiding layer 50 (as shown in FIG. 15(c)). In yet another embodiment of the present disclosure, four light sources 51 are provided, and the four light sources 51 are respectively disposed on four sides of the light guiding layer 50 (as shown in FIG. 15(d)).

In the embodiments of the present disclosure, compared with the situation in which only one light source 51 is provided and the one light source 51 is disposed on one side of the light guiding layer 50, in a case where a plurality of light sources 51 are provided and the plurality of light sources 51 are respectively disposed on a plurality of sides of the light guiding layer 50, the intensity of light entering the light guiding layer 50 may be increased, and thus the intensity of light incident on the photosensitive sensing layer 10 is increased, thereby increasing the accuracy of texture detection. In a case where the plurality of light sources 51 are respectively disposed on two opposite sides of the light guiding layer 50 or respectively disposed on four sides of the light guiding layer 50, the intensity of light entering each position of the light guiding layer 50 may be made equal, so that the texture detection result will not be affected by a difference in light intensity at different positions of the light guiding layer 50.

Figure 16:
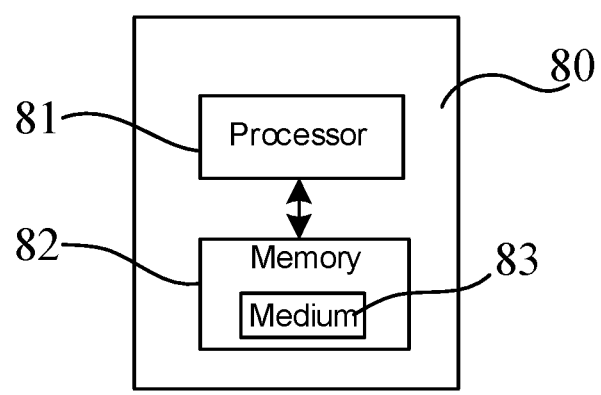
FIG. 16 is a schematic diagram showing a structure of a controller according to some embodiments of the present disclosure.

Some embodiments of the present disclosure further provide a controller 80 for use in the texture detection device described above. As shown in FIG. 16, the controller 80 includes a processor 81 and a memory 82. The memory 82 stores computer instructions executed by the processor 81. The computer instructions are configured to perform the following method of detecting a texture when the processor 81 is running: in each of a plurality of time periods included in a texture detection phase, forming a light-shielding region in the light transmitting hole forming layer, wherein the light-shielding region only includes a part of a plurality of light transmitting holes, and imaging regions of a texture to be detected on the photosensitive sensing layer through the light transmitting hole forming layer do not overlap. In different time periods of the plurality of time periods, positions of parts of the plurality of light transmitting holes included in the light-shielding regions formed in the light transmitting hole forming layer are different. The controller is further configured to splice images of the texture to be detected formed on the photosensitive sensing layer in each of the plurality of time periods together.

Some other embodiments of the present disclosure further provide a non-transitory computer-readable storage medium 83. The non-transitory computer-readable storage medium stores computer instructions executed by a processor, and the computer instructions are configured to execute the above method of detecting a texture when the processor is running.

Yet some other embodiments of the present disclosure further provide a computer program product. The computer program product includes instructions that, when run on a computer, cause the computer to perform the method of detecting a texture as described above.

Yet some other embodiments of the present disclosure further provide a computer program. When loaded into the processor, the computer program causes the processor to perform the method of detecting a texture as described above Steps of a method or algorithm described in the embodiments of the present disclosure may be implemented by a processor executing software instructions. The software instructions may be composed of corresponding software modules. The software modules may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read-only memory (CD-ROM), or any other form of storage medium known in the art. An exemplary storage medium is coupled to the processor to enable the processor to read information from, and write information to, the storage medium. The processor may be devices having logic computing capabilities and/or program execution capabilities, such as a central processing unit (CPU), a field programmable logic array (FPGA), a microcontroller unit (MCU), and an application specific integrated circuit (ASIC).

Those skilled in the art will appreciate that in one or more examples described above, the functions described herein can be implemented by hardware, software, firmware, or any combination thereof. When implemented by software, the functions may be stored in a computer readable medium or transmitted as one or more instructions or codes on a computer readable medium. Computer readable media includes both computer storage media and communication media. The communication media includes any medium that facilitates the transfer of a computer program from one location to another. A storage medium may be any available medium that can be accessed by a general purpose or special purpose computer. In embodiments of the present disclosure, when communication of data, information, or the like occurs, direct or indirect communication can be performed through a network connection. For example, the network may include wireless networks, wired networks, and/or any combination of wireless networks and wired networks. The network may include a local area network, the Internet, a telecommunications network, an internet of things based on the Internet and/or telecommunications network, and/or any combination of the above networks. The wired networks may communicate by using, for example, a twisted-pair cable, a coaxial cable, or an optical fiber. The wireless networks may communicate through a 3G/4G/5G mobile communication network, Bluetooth, Zigbee, or Wi-Fi.

In the description of the above embodiments, specific features, structures, materials or characteristics may be combined in any suitable manner in any one or more embodiments or examples.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. A method of detecting a texture using a texture detection device, the texture detection device comprising a light guiding layer, at least one light source, a light transmitting hole forming layer, and a photosensitive sensing layer that is located on a side of the light transmitting hole forming layer away from the light guiding layer, the at least one light source being located on at least one side of the light guiding layer, wherein in a texture detection phase, light-shielding regions comprising a plurality of light transmitting holes are formed in regions of the light transmitting hole forming layer corresponding to a texture detection region, and imaging regions of at least two adjacent light transmitting holes of the plurality of light transmitting holes on the photosensitive sensing layer at least partially overlap; wherein
a size of the light transmitting hole is greater than or equal to 1 μm and less than or equal to 30 μm; or, the size of the light transmitting hole is greater than or equal to about 1 μm and less than or equal to about 30 μm; and
the method of detecting the texture comprises:
in each of a plurality of time periods comprised in the texture detection phase, forming a light-shielding region in the light transmitting hole forming layer, wherein the light-shielding region only comprises a part of the plurality of light transmitting holes, and imaging regions of a texture to be detected on the photosensitive sensing layer through the light transmitting hole forming layer do not overlap; in different time periods of the plurality of time periods, positions of parts of the plurality of light transmitting holes com-prised in the light-shielding regions formed in the light transmitting hole forming layer are different; and splicing images of the texture to be detected formed on the photosensitive sensing layer in the plurality of time periods together.

2. The method of detecting the texture according to claim 1, wherein the method further comprises: before the texture detection phase, determining the texture detection region according to a touch position of the texture to be detected on the texture detection device.

3. The method of detecting the texture according to claim 1, wherein the plurality of time periods comprise two time periods.

4. The method of detecting the texture according to claim 1, wherein the texture detection device further comprises a display panel disposed between the light transmitting hole forming layer and the photosensitive sensing layer; and
the method of detecting the texture further comprises:
in the texture detection phase, controlling the light transmitting hole forming layer to appear completely transparent in a region other than the texture detection region.

5. The method of detecting the texture according to claim 1, wherein the light transmitting hole forming layer comprises a liquid crystal display panel; and
the method of detecting the texture further comprises:
in the texture detection phase, controlling the liquid crystal display panel to display an image in a display region other than the texture detection region.

6. A texture detection device, comprising a light guiding layer, at least one light source, a light transmitting hole forming layer, a photosensitive sensing layer disposed on a side of the light transmitting hole forming layer away from the light guiding layer, and a controller, the at least one light source being disposed on at least one side of the light guiding layer, wherein, in a texture detection phase, light-shielding regions comprising a plurality of light transmitting holes are formed in regions of the light transmitting hole forming layer corresponding to a texture detection region, and imaging regions of at least two adjacent light transmitting holes of the plurality of light transmitting holes on the photosensitive sensing layer at least partially overlap; wherein
a size of the light transmitting hole is greater than or equal to 1 μm and less than or equal to 30 μm; or, the size of the light transmitting hole is greater than or equal to about 1 μm and less than or equal to about 30 μm; and
the controller is configured to, in each of a plurality of time periods comprised in the texture detection phase, form a light-shielding region in the light transmitting hole forming layer, wherein the light-shielding region only comprises a part of the plurality of light transmitting holes, and imaging regions of a texture to be detected on the photosensitive sensing layer through the light transmitting hole forming layer do not overlap; in different time periods of the plurality of time periods, positions of parts of the plurality of light transmitting holes comprised in the light-shielding regions formed in the light transmitting hole forming layer are different; and the controller is further configured to splice images of the texture to be detected formed on the photosensitive sensing layer in the plurality of time periods together.

7. The texture detection device according to claim 6, wherein the controller is further configured to, before the texture detection phase, determine the texture detection region according to a touch position of the texture to be detected on the texture detection device.

8. The texture detection device according to claim 6, wherein the texture detection device further comprises a display panel disposed between the light transmitting hole forming layer and the photosensitive sensing layer; and the controller is further configured to, in the texture detection phase, control the light transmitting hole forming layer to appear completely transparent in a region other than the texture detection region.

9. The texture detection device according to claim 8, wherein a photosensitive sensor of the photosensitive sensing layer corresponds to a pixel region or a sub-pixel region of the display panel, and a ratio of an area of the photosensitive sensor corresponding to each pixel region or each sub-pixel region to an area of each pixel region or each sub-pixel region is greater than or equal to 1:4 and less than or equal to 1:1, or, the ratio of the area of the photosensitive sensor corresponding to each pixel region or each sub-pixel region to the area of each pixel region or each sub-pixel region is greater than or equal to about 1:4 and less than or equal to about 1:1.

10. The texture detection device according to claim 6, wherein the light transmitting hole forming layer comprises a liquid crystal display panel; and the controller is further configured to, in the texture detection phase, control the liquid crystal display panel to display an image in a display region other than the texture detection region.

11. The texture detection device according to claim 10, wherein the liquid crystal display panel comprises a black matrix, and an orthographic projection of the black matrix on the light guiding layer covers orthographic projections of photosensitive sensors of the photosensitive sensing layer on the light guiding layer; and light emitted by the at least one light source is infrared light.

12. The texture detection device according to claim 6, wherein the at least one light source comprises a plurality of light sources, and the plurality of light sources are respectively located on a plurality of sides of the light guiding layer.

13. A non-transitory computer-readable storage medium storing computer instructions executed by a processor, wherein the computer instructions are configured to execute the method of detecting the texture according to claim 1 when the processor is running.

* * * * *